3,271,370
POLY(1,4-CYCLOHEXYLENEDIMETHYLENE TER-
EPHTHALATE) PROCESS USING SUBSTANTIAL-
LY EQUAL PROPORTIONS OF REACTANTS
George A. Akin, Sarah J. Rush, and Nicholas C. Russin,
Kingsport, Tenn., assignors to Eastman Kodak Com-
pany, Rochester, N.Y., a corporation of New Jersey
No Drawing. Filed Nov. 10, 1961, Ser. No. 151,455
6 Claims. (Cl. 260—75)

This invention relates to a process for the production of ester products, e.g., polyesters prepared from one or more lower alcohol diesters of dicarboxylic acids condensed with a glycol, most particularly the reaction of dimethyl terephthalate alone or mixed with esters of other dibasic acids and 1,4-cyclohexanedimethanol alone or mixed with other glycols.

Fiber-producing polyesters prepared from diesters of dicarboxylic acids and dihydric alcohols such as ethylene glycol and/or 1,4-cyclohexanedimethanol are conveniently prepared in a plurality of reactors, the first reactor being used for the preparation of an intermediate molecular weight "monomer" or "prepolymer" and one or more additional reactors being used for further polymerization to a polymer of higher molecular weight. Quite often considerable difficulty is encountered due to the vigorous reaction between the one or more diesters of the dicarboxylic acid and ethylene glycol, 1,4-cyclohexanedimethanol or other dihydric alcohols being used in the initial condensation step with the resultant solidification of the ester-interchange product, especially at low ratios of well under two moles of dihydric alcohol to one mole of diester starting material. This solidification results from the rapid formation of high melting polymer at the same time that the mixture is being cooled by the rapid vaporization of the mono-hydric alcohol formed by the reaction. Also in the second or polymerization stage, various problems have arisen which have not yet been completely solved. For example when the final polymerization process is carried out in the liquid phase it is necessary to constantly renew the surface area of the material undergoing polymerization in order to provide for the complete removal of the volatile materials formed. This is conveniently done by maintaining the polymerizing mixture in a thin film or similar state of high surface area or by repeatedly reforming the material into such a state. Stirred reactors of the prior art are often unable to maintain a film of the desired thinness and the moving parts of such a stirred reactor require special seals which are difficult to maintain in a leak-proof condition. Efforts to provide for the proper molecular weight build-up of the polymer and the removal of excess glycol have heretofore met with considerable difficulty; hence, it is advantageous to use a process wherein continuous polymerization is conducted in an evacuated vertical reaction vessel wherein the polyester being built up in molecular weight flows downwardly from one sloped baffle plate to the next one below and on down in sequence to the bottom of the vessel, by which time it has achieved the desired high molecular weight such as indicated by an inherent viscosity of 0.6 to 3.0 or more as measured in a solution in 60 percent phenol plus 40 percent tetrachloroethane or some other convenient solvent. However, quite surprisingly, the present invention in one of its embodiments makes it much easier to conduct the entire process on a batch basis in a single piece of apparatus; in addition, continuous processes which are much improved are provided by this invention.

Accordingly, it is an object of this invention to provide a process for the production of polyesters prepared from diesters of dicarboxylic acids and dihydric alcohols which permits an unexpectedly increased efficiency in the use of reactants without the solidification of the product produced in the transesterification or prepolymerization phase. A further object is to provide a simplified process for the production of polyesters prepared from dimethyl terephthalate and 1,4-cyclohexanedimethanol. Further objects will appear hereinafter.

According to one embodiment, this invention provides a process for reacting a glycol starting material comprising at least 90 mole percent of 1,4-cyclohexanedimethanol and an ester starting material comprising at least one ester of a 1 to 4 carbon atom alkanol and a dicarboxylic acid, of which at least 50 mole percent is a terephthalate diester, to form an ester product comprising at least one ester of a glycol and a dicarboxylic acid, comprising heating substantially one mole portion of said glycol starting material and one mole proportion of said ester starting material at a temperature above the melting point of the reaction mixture, removing by distillation from the reaction mixture a major portion of the alkanol being formed, and retaining the remaining portion thereof so that substantially all of the unreacted glycol and substantially all of the unreacted ester starting material are retained in the reaction mixture. In certain cases when the ester product formed tends to have a very high melting point, such as the reaction product of 1,4-cyclohexanedimethanol and dimethyl terephthalate, it may be necessary to maintain the reaction mixture for a period of time under an elevated pressure of the alkanol being removed in order to lower its rate of removal and to reduce the melting point of the reaction mixture to prevent solidification. In these cases it has been found that pressures of 30 to 100 pounds per square inch above atmospheric achieve these objectives.

In such a process the diester of the dicarboxylic acid together with a catalyst can be led into an ester interchange reaction vessel which can be called a prepolymerizer, the bottom portion of which is heated with hot oil or the like and the upper portion or portions heated by steam, hot oil, or the like. The dihydric alcohol (glycol) can be pumped into the top of the reactor and transesterification product removed from the bottom of the reactor and thereafter conducted through one or more separate intermediate reactors, if desirable, prior to being conducted to a final polymerization reactor. The final reactor can advantageously be divided into an upper zone and a lower zone, the two zones being separated by a liquid seal. The polymer produced in the final polymerization reactor can then be removed at the bottom thereof by means of extruder screw or other convenient means and formed into pellets, rods, fibers, film or the like.

Previous procedures for preparing linear polyesters have involved the reaction of the dibasic acids or their esters with a molar excess of the glycol. These procedures have been necessary in order to produce high molecular weight polymers suitable for producing films, fibers or the like which are capable of orientation to develop the strength, elasticity and other properties related to oriented polymers. This molar excess of glycol however must be removed before the high molecular weight polymer can be produced. This removal has been difficult and has required a relatively long period of time to achieve. At the high temperatures required to keep some of the polymers in a molten state the materials tend to develop color and to develop decomposition products which act as chain terminators preventing the development of polymers with molecular weights as high as might be desired. Now we have discovered that when cyclohexanedimethanol is used as the glycol and an ester of terephthalic acid is used as the acid component, the reaction to produce the polymer can be carried out much more quickly and to higher molecular weights if substantially equal molar amounts of this glycol and ester of terephthalic acid are reacted. There may be other glycols which act in a similar manner, but the other common glycol used in producing linear polyesters does not act in this way. Ethylene glycol is usually used in at least 50 percent molar excess when producing high molecular weight polyethylene terephthalate.

According to another embodiment, this invention provides an improvement in a continuous process for reacting a glycol starting material comprising at least 90 mole percent of 1,4-cyclohexanedimethanol and an ester starting material comprising at least one ester of a 1 to 4 carbon atom alkanol and dicarboxylic acid, of which at least 50 mole percent is a terephthalate diester, to form an ester product comprising at least one ester of a glycol and a dicarboxylic acid, the improvement which comprises feeding in proportion substantially one mole of said glycol starting material and 1 mole of said ester starting material to a vertically elongated reaction zone containing an ester interchange catalyst, at least 10 mole percent of said glycol starting material being fed at a point above said ester starting material, withdrawing from the lower end of said zone said ester product being formed, removing by distillation from the upper end of said zone under a pressure up to 100 pounds per square inch gauge a portion of the alkanol being formed while retaining the remaining portion thereof along with substantially all of the unreacted glycol.

The ester interchange reaction vessel can be a simple pot type reactor equipped with a condenser or it can be of the type described in U.S. Patent No. 2,829,153 or any other type such as a packed column or combinations of apparatus elements designed to heat the reactants and remove the desired amount of lower boiling alcohol (1–4 carbon alkanol) while maintaining the desired pressure. The vapor pressure of the alcohol in the system, that is the alcohol vapor pressure of the reaction mixture, will be determined by the pressure maintained. The concentration of the free alcohol in the reaction product is thus determined by this pressure among other things. The concentration of combined alcohol depends on that of the free alcohol and therefore also on the pressure. System pressures of 30 to 100 pounds per square inch above atmospheric maintain these concentrations, in the case of the reaction between dimethyl terephthalate and cyclohexanedimethanol at such values that the total quantity of alcohol in the ester product is maintained at the desired value of 10 to 50 percent of that originally combined with the dimethyl terephthalate feed. This includes that which is in solution in the molten ester product being discharged as well as that present as a chemical constituent of the ester product.

In accordance with this invention it has been found that when equivalent amounts of dimethyl terephthalate and 1,4-cyclohexanedimethanol are melted together under atmospheric pressure with a catalyst such as a titanium tetraalkoxide at elevated temperatures a vigorous reaction results with the elimination of methanol. If the amount of reactants is small and the heat supply ample, a prepolymer of inherent viscosity 0.30–0.40 can be prepared in much less time than is necessary when using the conventional 50–100 percent excess of glycol. However, in larger quantities the reaction was so rapid that the ester interchange product solidified before sufficient heat could be supplied to keep it in a melted form. However, if the two reactants and catalyst are heated under pressures of 30 p.s.i.g. or greater, the polymerization can be controlled so as to maintain a molten condition throughout the preparation. This is accomplished by retaining in the reaction mixture a larger portion of the methanol being formed. The unexpected advantages of doing this provide a quite unobvious improvement. After a certain degree of polymerization is achieved the pressure can be reduced while maintaining the temperature above the melting point of the reaction mixture, using the same vessel if desired, and the methanol removed to increase the degree of polymerization. A greater vacuum can then be applied to finish the polymerization.

Examples 1, 2 and 15 set forth below illustrate that the initial formation of prepolymer in small quantities can be achieved at atmospheric pressure; but, in larger quantities the process is inoperable unless an elevated pressure is employed. When the quantity of reactants is more than about 10 pounds per hour, the use of the process of this invention becomes especially advantageous.

This process has been found to be especially adaptable to continuous operation, although it is not limited to such since the reaction can also be carried out on a batch scale under pressure.

Some of the advantages of carrying out the ester interchange under pressure are as follows:

(1) Makes it possible to carry out the reaction using a substantially equimolecular amount of, or at the most only a slight excess of glycol. The reaction is controlled by the presence of methanol in the mixture which gives a lower melting product than if all the methanol was removed as it is formed.

(2) The reaction can be carried out at high temperatures where the reaction rate is fast and at the same time the reaction can be controlled by controlling the rate of methanol evolution.

(3) Under these conditions the dimethyl terephthalate and the glycol are kept in the reaction vessel until they react. In such a reaction carried out at atmospheric pressure a considerable amount of the ester and glycol are carried off with the methanol vapors. If these vapors are condensed at atmospheric pressure the DMT crystallizes and clogs the equipment.

The material produced by one aspect of the process of this invention is a mixture of monomer and low-molecular-weight material which can then be polymerized by methods well known in the art to a high-molecular-weight film- or fiber-forming polymer.

In addition, for example, it has been found in the continuous production of poly(1,4-cyclohexylenedimethylene terephthalate) that the use of an excess of the glycol is disadvantageous. In fact, the use of large excesses (over 20 percent) of glycol makes it impossible without major equipment alterations to produce polymer of the desired molecular weight and that, other conditions remaining the same, the molecular weight increases as the excess of glycol is reduced.

As to this particular process it has also been found that when one mole of 1,4-cyclohexanedimethanol and at least one mole of dimethyl terephthalate are melted together in the presence of a suitable catalyst at atmospheric pressure and elevated temperature, a vigorous reaction occurs with methanol being evolved. In batch runs, if the amount of reactants is small and the heat supply sufficient, a low molecular weight polymer can be prepared in much less time than is required when the conventional excess of glycol is employed. In larger quantities, the reaction is so rapid that the ester interchange product solidifies before sufficient heat can be supplied to keep the product molten. This difficulty can be overcome by carrying out the ester interchange at pressures of 30 p.s.i.g. or greater in order to control the reaction rate and thus maintain the product in a molten condition during polymerization.

Some of the advantages of using equimolecular amounts of cyclohexanedimethanol and ester of the dibasic acid are as follows:

(1) The reaction is more rapid thus decreasing the size of the equipment required.

(2) The reactants are heated a shorter period of time resulting in a smaller amount of decomposition products.

(3) The free alcohol groups of the unreacted glycol are present in a smaller concentration and therefore would be expected to form fewer byproducts by dehydration or dehydrogenation.

(4) There will be a smaller amount of material vaporized from the polymerization reactor thus reducing the amount of recovery that must be carried out.

This invention can be further illustrated by the following examples of preferred embodiments thereof although it will be understood that these examples are included merely for purposes of illustration and are not intended to limit the scope of the invention unless otherwise specifically indicated:

EXAMPLE 1

A mixture of 3.88 grams (0.02 mole) of dimethyl terephthalate, 2.88 grams (0.02 mole) of 1,4-cyclohexanedimethanol (65 to 70% trans isomer), and one drop of a solution of $Mg[HTi—(OC_4H_9)_6]_2$ in n-butanol (2.38% total metals) were placed in a test tube heated in a block to 309° C. The reaction was vigorous with methanol being evolved. In eight (8) minutes, the ester interchange reaction was practically completed. The resulting molten product now at a temperature of 272° C. was subjected to a reduced pressure. It was held at a pressure of less than one (1) mm. of mercury for eight and one-half (8½) minutes during which time polymerization occurred. The reaction mixture was then subjected to a nitrogen pressure of one atmosphere, cooled, and the resulting low molecular weight polymer was pulverized to a fine powder. This powder was further polymerized by the solid phase vacuum technique at 260° C. for three (3) hours to give a polymer with an average molecular weight which corresponds to an inherent viscosity of 0.89. This polymer had the characteristics necessary for the production of useful films and fibers. In addition, the yield of useful polymer obtained by this method was greater than that obtained by prior methods involving an excess of glycol. This example was repeated and gave a polymer with an inherent viscosity of 0.87.

EXAMPLE 2

A mixture of 3.88 grams (0.02 mole) of dimethyl terephthalate, 3.18 grams (0.022 mole) of 1,4-cyclohexanedimethanol (10 percent molar excess), and one drop of the catalyst used in Example 1 were placed in a test tube and heated in a block at 310° C. The ester interchange reaction was complete in twenty (20) minutes. The resulting molten product was subjected to a vacuum as in Example 1 for ten (10) minutes and then treated in an identical manner as in Example 1. The resulting polymer had an inherent viscosity of 0.81 and the yield was less than that obtained in Example 1.

EXAMPLE 3

In a continuous polymer production system, 1,4-cyclohexanedimethanol containing catalyst was pumped to the second tray from the top of a nine (9) tray ester interchange reaction column fourteen (14) inches in diameter at a rate of 252 pounds (1.75 pound moles) per hour. Dimethyl terephthalate was pumped into the reactor at the third tray at a rate of 340 pounds (1.75 pound moles) per hour. The reaction column was operated at a pressure of 40 p.s.i.g. and was heated to 300° C. The materials flowed down the lower six (6) trays of the column during which time the ester interchange reaction was completed and the product was forced into the second reaction stage.

The retention time on the trays of the first reactor was calculated to be eight (8) minutes. Liquid methanol was fed to the top tray of the reactor to prevent the loss of glycol or dimethyl terephthalate.

The second reaction stage has a hold-up time of about fifteen (15) minutes and consists of a fourteen (14) inch diameter, heated vessel. Atmospheric pressure and a temperature of 300° C. were maintained in this stage and the residual methanol and other materials volatile under these conditions were removed.

The product from the second reaction stage was conveyed to the third reaction stage where a reduced pressure of 1 mm. of mercury was maintained. In this reactor the material flowed by gravity down over three (3) trays and seven (7) baffles maintained at 300° C. to allow sufficient heat transfer surface area to maintain the polymer temperature above the melting point (294° C.). The combination of reduced pressure and temperature promoted the removal of volatile materials which were removed from the system with the concurrent polymerization of the polymer. The product with an inherent viscosity of 0.85 was discharged by a screw extruder from the bottom of the reactor.

It will, of course be realized that in a production process slight variations of the feed rates of the two streams of feed materials, i.e. glycol and ester may occur. Therefore some slight variations from the desired 1–1 molar ratio are experienced from time to time. Examples 3, 4, and 5 illustrate the fact that while an exact 1–1 ratio is our desired control point it may be varied therefrom to some extent and still produce a high molecular weight polymer. However any considerable deviation from this ratio under the conditions used will cause some loss in inherent viscosity.

EXAMPLE 4

The conditions in Example 3 were maintained except that the glycol feed rate was increased to 277 pounds (1.925 pound moles) per hour. This ten (10) percent molar excess of glycol resulted in a lowering of the product inherent viscosity to 0.77. The product color was somewhat poorer than that obtained in Example 3.

EXAMPLE 5

The conditions in Example 3 were maintained except that the dimethyl terephthalate feed rate was increased to 357 pounds (1.84 pound moles) per hour. This five (5) percent molar excess of dimethyl terephthalate resulted in a polymer with an inherent viscosity of 0.88 and a noticeably better color than that obtained in the two preceding examples.

EXAMPLE 6

The conditions in Example 3 were maintained except the feed rates of both glycol and dimethyl terephthalate were each increased fifty (50) percent to 2.63 pound moles per hour. Under these conditions, the product from the reactor had an inherent viscosity of 0.86.

EXAMPLE 7

The conditions in Example 4 were maintained except the feed rates of both glycol and dimethyl terephthalate were each increased fifty (50) percent to 2.89 and 2.63 pound moles per hour respectively. The resulting product had an inherent viscosity of 0.75.

EXAMPLE 8.—PREPARATION OF TEREPHTHALIC ACID 1,4-CYCLOHEXANEDIMETHANOL POLYESTER CONTAINING 1% GLYCEROL

Dimethyl terephthalate (1 mole), 1,4-cyclohexanedimethanol (1.1 mole), glycerol (.01 mole) and titanium tetraisopropoxide catalyst (sufficient to give .015% titanium metal in the final polymer) were continuously fed into an ester interchange column. The column was heated by means of oil maintained at 300° C. The mixture of ester and glycol was fed at the rate of 10 lbs. per hour and the pressure in the column maintained at 40 p.s.i. gauge by venting part of the methanol. The feed from this column was pumped into a baffle-plate polymerization build up reactor column as described above which was maintained at 300° C. by an oil heating system and a pressure of 0.025 to 0.01 mm. The product from this column had an inherent viscosity of 0.83. The polymer was melt spun into yarn and the as-spun fibers were drafted in super heated steam.

EXAMPLE 9.—PREPARATION OF TEREPHTHALIC ACID 1,4-CYCLOHEXANEDIMETHANOL POLYESTER

A run similar to that of Example 8 was made except for omitting the glycerol. The polymer so obtained had a viscosity of 0.80 and was melt spun into yarn under the same conditions as used in Example 8.

*Comparison of fiber properties of Examples 8 and 9*

The fiber properties of the processed fiber of Examples 8 and 9 were compared. The modified polyester of Example 8 was found to yield fibers with a tenacity of 3.4 to 3.7 g./d., an elongation of 23 to 30%, and an elastic modulus of 33 to 39 g./d. The fiber from the other polyester of Example 9 was found to have a tenacity of 2.5 to 3.0 g./d. with an elongation of 23 to 30%. Thus, definitely higher tenacity at the same elongation was noted in the fiber from the glycerol modified polyester. From the preceding comparison, it can readily be seen that the use of small quantities of polyfunctional reagents as modifiers under these conditions imparts a 15–30% improvement in tenacity of the processed fiber which reduces the filament breakage on the drafting rolls. A similar improvement in processing occurs with polyesters prepared from 1,4-cyclohexanedimethanol which contain small amounts of other polyfunctional compounds.

The term polyester of or from 1,4-cyclohexanedimethanol is used herein to indicate those polyesters prepared from two or more dicarboxylic acids or esters and 1,4-cyclohexanedimethanol, or from one or more dicarboxylic acid esters, 1,4-cyclohexanedimethanol and at least one or more diols. Modifiers selected from aminocarboxylic acids, hydroxycarboxylic acids, aminoalcohols, and the like may be used. Representative of such polyesters based on 1,4-cyclohexanedimethanol are those described in U.S. 2,901,466 and in co-pending applications Serial Nos. 823,295; 823,296; 823,298. Polyesters of ethylene glycol and other dihydric alcohols are illustrated in numerous patents including U.S. 2,465,319 and need no further elaboration in this specification which is limited to the use of up to about 10 mole percent of such other dihydric alcohols, i.e. up to as much as 17 mole percent in certain instances.

EXAMPLE 10.—PREPARATION OF POLYESTER FROM DIMETHYL TEREPHTHALATE AND 1,4-CYCLOHEXANEDIMETHANOL

Dimethyl terephthalate (1 mole) and 1,4-cyclohexanedimethanol (1.1 mole) were mixed and continuously fed along with titanium alkoxide catalyst to an ester interchange column. The column wase heated by means of oil which was maintained at 300° C. The mixture of ester and glycol was fed at the rate of 10 lbs. per hour and the pressure in the column was maintained at 40 p.s.i. gauge by venting part of the methanol. The abbreviation p.s.i. as used herein refers to pounds per square inch gauge. Under these conditions the methanol distilled from the column did not contain any dimethyl terephthalate or 1,4-cyclohexanedimethanol. When the feed rate was increased to 18–20 lbs. per hour, the pressure in the column was raised to 60–70 p.s.i. The feed from this column was pumped into a polymerizer such as that described above wherein the final built up polymer was formed.

EXAMPLE 11.—PREPARATION OF POLYESTER FROM DIMETHYL TEREPHTHALATE, DIBUTYL GLUTARATE, AND 1,4-CYCLOHEXANEDIMETHANOL

A similar reaction was carried out as in Example 10 except that the fed consisted of dimethyl terephthalate (0.75 mole) dibutyl glutarate (0.25 mole) and 1,4-cyclohexanedimethanol (1.0 mole). This mixture was fed at a rate of 20 lbs. per hour into a column operated at 290° C. and under 60–70 p.s.i. The catalyst which was also continuously fed into the reactor consisted of a solution of titanium isopropoxide in methanol. The final polymer was collected from the baffled final polymeriaztion reactor.

EXAMPLE 12.—PREPARATION OF POLYESTER FROM DIMETHYL TEREPHTHALATE, DIBUTYL ISOPHTHALATE AND 1,4-CYCLOHEXANEDIMETHANOL

A reaction was carried out as in Example 11, including the collection of the final polymer, except that the feed consisted of a mixture of dimethyl terephthalate (0.83 mole), dibutyl isophthalate (0.17 mole) and 1,4-cyclohexanedimethanol (1.0 mole). A high molecular weight polymer with an inherent viscosity of 0.88 resulted.

Although this invention pertains particularly to unobvious consequences associated with the use of 1,4-cyclohexanedimethanol, the following example illustrates the preparation of polyester of dimethyl terephthalate and ethylene glycol using a higher ratio of glycol as is generally necessary with this glycol.

A reaction was carried out in the same manner as described above except that the feed consisted of dimethyl terephthalate (1 mole) and ethylene glycol (1.3 moles). This mixture was fed at a rate of 15 lbs. per hour into a column operated at 270–275° C. and under 60–70° p.s.i. The prepolymer was conducted to a baffled polymerization chamber and the polymerization completed therein. Dark brown polymer with an inherent viscosity of 0.49 resulted. This reaction was repeated using equal molar amounts of dimethyl terephthalate and ethylene glycol. The material produced was not a high polymer.

EXAMPLE 13.—1,4-CYCLOHEXANEDIMETHANOL POLYESTER MADE BY THE BATCH PROCESS

Dimethyl terephthalate (8 moles) and 1,4-cyclohexanedimethanol (8.4 moles) were mixed together in a stirred vessel in the presence of titanium alkoxide catalyst. The reaction vessel was maintained at a temperature of 120° C. for ¼ hour with a slow stream of nitrogen (5 cubic feet per hour) passing over the reaction mixture. This illustrates that pressure does not have to be applied immediately when the reaction first gets underway. The pressure in the reaction vessel was then increased using nitrogen so as to approach 30 p.s.i. (25–30 p.s.i.). The temperature was increased to 300° C. during which time the pressure in the reactor increased to 40–45 p.s.i. and was kept at that value by bleeding off some of the methanol vapor. The system was maintained at a temperature of 300° C. and 40–45 p.s.i. for ¼ hour. Since the advantages of using an elevated pressure had by this time been achieved, the pressure in the system was then released to atmospheric. Nitrogen at the rate of 5 c.f.h. was again passed over the stirred melt and the temperature was increased to 310° C. The system was held at this temperature for ½ hour during which time the slight excess of glycol was condensed in the cold traps. The system was then taken to 30″ of Hg vacuum at the rate of 1″ Hg per minute. At this point it was extruded into water as a low molecular polymer (prepolymer) with an inherent viscosity of 0.3. This prepolymer was then pulverized and polymerized in the solid phase at reduced pressure. Polymer with an inherent viscosity of 1.3 was produced.

The following example illustrates the increased and more efficient polymerization when the prepolymer was formed under pressure using reactants different from Example 13.

EXAMPLE 14.—1,4-CYCLOHEXANEDIMETHANOL POLYESTER MODIFIED WITH 25 MOLE PERCENT OF SUCCINIC ACID MADE BY THE BATCH PROCESS UNDER PRESSURE

Dimethyl terephthalate (6 moles), succinic anhydride (2 moles), and 1,4-cyclohexanedimethanol (7.6 moles) were mixed together in the presence of titanium alkoxide catalyst in a stirred vessel at 120° C. Nitrogen (5 c.f.h.) was passed over the reaction mixture under these conditions for ¼ hour. The pressure on the system was then increased to 25 p.s.i. with $N_2$ and the hot oil temperature increased to 270° C. Methanol from the ester interchange reaction caused the pressure to rise. A pressure of 40 p.s.i. was maintained by carefully venting the methanol vapor. These conditions (270° C. and 40 p.s.i.) were held for ½ hour, after which the pressure was reduced to atmospheric pressure for ¼ hour after which it was taken to 30″ of Hg vacuum at the rate of 1″ of Hg per minute. At these conditions rapid polymerization took place to give a product with an inherent viscosity of 0.9 in ½ hour at reduced pressure; whereas, products with inherent viscosities of 0.7 to 0.8 required approximately 2 hours polymerization time at reduced pressure when 20–25% excess diol and atmospheric pressure were used for the ester interchange reaction.

EXAMPLE 15.—PREPARATION OF A POLYESTER USING 2% EXCESS DIMETHYL TEREPHTHALATE

A mixture of 3.88 g. (0.02 mole) of dimethyl terephthalate, 2.83 g. (0.0196 mole) of 1,4-cyclohexanedimethanol (65 to 70% trans isomer), and 1 drop of a solution of $Mg[HTi(OC_4H_9)_6]_2$ in n-butanol (2.38% total metals) was placed in a tube, and then heated in $N_2$ atmosphere in a block at 310° C. The materials formed a clear solution and began reacting immediately evolving methanol. In about 7 minutes, the ester interchange was practically completed and temperature of the mixture was now about 260°. A vacuum was applied to the material and it was held at a pressure of less than 1.0 mm. for six minutes to produce a low molecular weight polymer. The tube was cooled and the vacuum released with $N_2$. The resulting material was pulverized to a fine powder and this was further polymerized by solid phase method at 260° C. at 0.08 mm. for 3 hours giving a polymer with an inherent viscosity of 0.76

It was observed that a smaller amount of glycol decomposition products was formed in Example 3 and 5 than in Example 4. Analysis of the volatile products from the reactors showed the following average amount of by-products formed in pounds per hour.

|  | Example 3 | Example 4 | Example 5 |
|---|---|---|---|
| Methylene cyclohexanemethanol | 1.7 | 4.5 | 1.0 |
| 4-Methoxymethyl cyclohexanemethanol | 1.4 | 1.5 | 1.5 |
| 4-Hydroxymethyl cyclohexanecarboxaldehyde | 0.5 | 0.2 | 0.3 |
| Totals | 3.6 | 6.2 | 2.8 |

From this data it can be seen that 5% excess dimethyl-terephthalate provides a minimal level of decomposition products in this process and the best color; that is quite surprising since an actual shortage of glycol is employed in a process formerly thought to require as much or more than about 1.5 as many moles of glycol for each mole of dicarboxylic diester starting material.

The final polymerizations in various processes described above were carried out under high vacuum in the liquid phase to facilitate the removal of the volatile products formed in the reaction, thus enabling continuous operation. A pressure range from about 0.01 mm. to about 1 cm. can be used. The preferred range is from about 0.1 to about 5.0 mm. The temperature in the final polymerization reactor should not ordinarily exceed 350° C. Although in the above examples only a few catalysts have been illustrated, it is not intended to limit the process to the use of any such catalysts. Other suitable catalysts include those described in U.S. 2,465,319, U.S. 2,720,502, U.S. 2,727,881, etc. Thus, advantageous catalysts which can be used include zinc acetate, isopropyl titanate, a combination of such catalysts as lithium acetate, sodium hydroxide or both of these with aluminum isopropoxide, manganese acetate and magnesium-titanium butoxide. Titanium dioxide and other similar inorganic pigments may also be included in the reaction mixture along with antioxidants, dyes, stabilizers or other additives.

As discussed above, the processes of this invention advantageously include the use of at least 50 mole percent of dimethyl terephthalate as the starting ester of dicarboxylic acid. Other such esters include dibutyl terephthalate, diethyl isophthalate, diethyl adipate, dimethyl 2,6-naphthalenedicarboxylate, etc. The dihydric alcohol in some embodiments can include up to about 10 mole percent ethylene glycol, 1,2-propanediol, neopentyl glycol, 2,2,4,4-tetramethyl-1,3-cyclobutanediol, poly(tetramethylene glycol) of a molecular weight of 1000 to 5000, decamethylene glycol, 1,4-bis($\beta$-hydroxyethyl)benzene, etc.

Although the invention has been described in considerable detail with particular reference to certain preferred embodiments thereof, variations and modifications can be effected within the spirit and scope of the invention as described hereinabove, and as defined in the appended claims.

We claim:

1. A process for preparing a prepolymer having an inherent viscosity of about 0.30 to about 0.40 as measured in a solution of 60% phenol and 40% tetrachloroethane, said prepolymer being prepared by reacting a glycol comprising at least 90 mole percent of 1,4-cyclohexanedimethanol and at least one diester of a 1 to 4 carbon atom monohydric alkanol and a dicarboxylic acid, of which at least 50 mole percent is a terephthalate diester of a monohydric alkanol of 1 to 4 carbon atoms, said process comprising heating said glycol and said diester in a mole ratio of from about 0.95 to 1 up to about 1.05 to 1 under a pressure of at least about 30 but not exceeding about 100 pounds per square inch above atmospheric pressure at a temperature above the melting point of the reaction mixture, and removing by distillation from the reaction mixture the alkanol being formed while retaining substantially all of the unreacted glycol and substantially all of the unreacted diester in the reaction mixture until substantially all of said unreacted glycol and said unreacted diester are converted to said prepolymer.

2. A process as defined by claim 1 wherein essentially all of said diester is dimethyl terephthalate.

3. A process as defined by claim 2 wherein essentially all of said glycol is 1,4-cyclohexanedimethanol.

4. A continuous process for preparing a prepolymer having an inherent viscosity of about 0.3 to about 0.4 as measured in a solution of 60% phenol and 40% tetrachloroethane, said prepolymer being prepared by reacting a glycol comprising at least 90 mole percent of 1,4-cyclohexanedimethanol and at least one diester of a 1 to 4 carbon atom monohydric alkanol and a dicarboxylic acid, of which at least 50 mole percent is a terephthalate diester of a monohydric alkanol of 1 to 4 carbon atoms, said process comprising feeding said glycol and said diester in a mole ratio of from about 0.95 to 1 up to about 1.05 to 1 to a vertically elongated reaction zone containing an ester interchange catalyst, at least 10 mole percent of said glycol being fed at a point above where said diester is fed, withdrawing from the lower end of said zone said prepolymer being formed, removing by distillation from the upper end of said zone under a gauge pressure of at least 30 pounds per square inch a portion of the alkanol being formed while retaining substantially all of the unreacted glycol and substantially all of the unreacted diester in the reaction mixture until substantially all of said unreacted glycol and said unreacted diester are converted to said prepolymer.

5. A process as defined by claim 4 wherein essentially all of said diester is dimethyl terephthalate.

6. A process as defined by claim 5 wherein essentially all of said glycol is 1,4-cyclohexanedimethanol.

References Cited by the Examiner

UNITED STATES PATENTS

| | | | |
|---|---|---|---|
| 2,647,885 | 8/1963 | Billica | 260—75 |
| 2,829,153 | 4/1958 | Vodonik | 260—75 |
| 2,891,930 | 6/1959 | Caldwell et al. | 260—75 |
| 2,901,466 | 8/1959 | Kibler et al. | 260—75 |
| 2,905,707 | 9/1959 | Hurt et al. | 260—75 |
| 2,907,753 | 10/1959 | MacLean et al. | 260—75 |
| 3,050,533 | 12/1962 | Munro et al. | 260—75 |
| 3,157,619 | 11/1964 | Bell et al. | 260—75 |

WILLIAM H. SHORT, *Primary Examiner.*

JOSEPH LIEBERMAN, *Examiner.*

J. J. KLOCKO, L. P. QUAST, *Assistant Examiners.*